United States Patent [19]

Schoneck

[11] 3,889,997
[45] June 17, 1975

[54] AUTOMATICALLY OPERATING TRUCK END GATE STEPS

[76] Inventor: Clarence E. Schoneck, Box 104, Gull Lake, Canada

[22] Filed: Feb. 25, 1974

[21] Appl. No.: 445,440

[52] U.S. Cl. .................. 296/62; 280/166; 182/91
[51] Int. Cl. ............................................. B60r 3/02
[58] Field of Search ...... 296/62, 146, 152; 280/166; 182/95, 96, 91, 159; 186/156; 224/42.03 R, 42.08, 42.07; 105/447

[56] References Cited
UNITED STATES PATENTS
| | | | |
|---|---|---|---|
| 1,223,639 | 4/1917 | Swartsel | 296/62 |
| 2,536,966 | 1/1951 | Teller | 182/95 |
| 3,606,382 | 9/1971 | Pollock | 296/62 |

Primary Examiner—Robert J. Spar
Assistant Examiner—Gary Auton
Attorney, Agent, or Firm—Stanley G. Ade

[57] ABSTRACT

Truck end gate steps usually require accurate installation and are not universal in that they cannot be fitted to all end gate type trucks. It is therefore usual to design the step or steps to suit one make of truck. The present device is attached by four brackets, two on the bumper or transverse frame member if no bumper is present, and two on the upper edge of the end gate. A universal mounting plate is provided upon each side of the step with hanger straps extending up to the brackets on the tail gate and hanger straps extending back to the brackets on the bumper or frame member. The anchor straps are adjustable in length and in their attachment to the mounting plates and the hanger straps can be pivotally secured in any one of several apertures in the mounting plate above the securement of the anchor straps.

4 Claims, 4 Drawing Figures

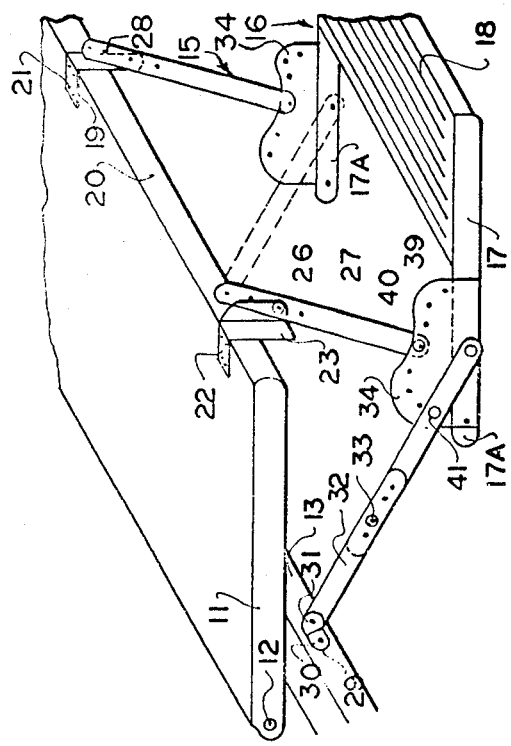
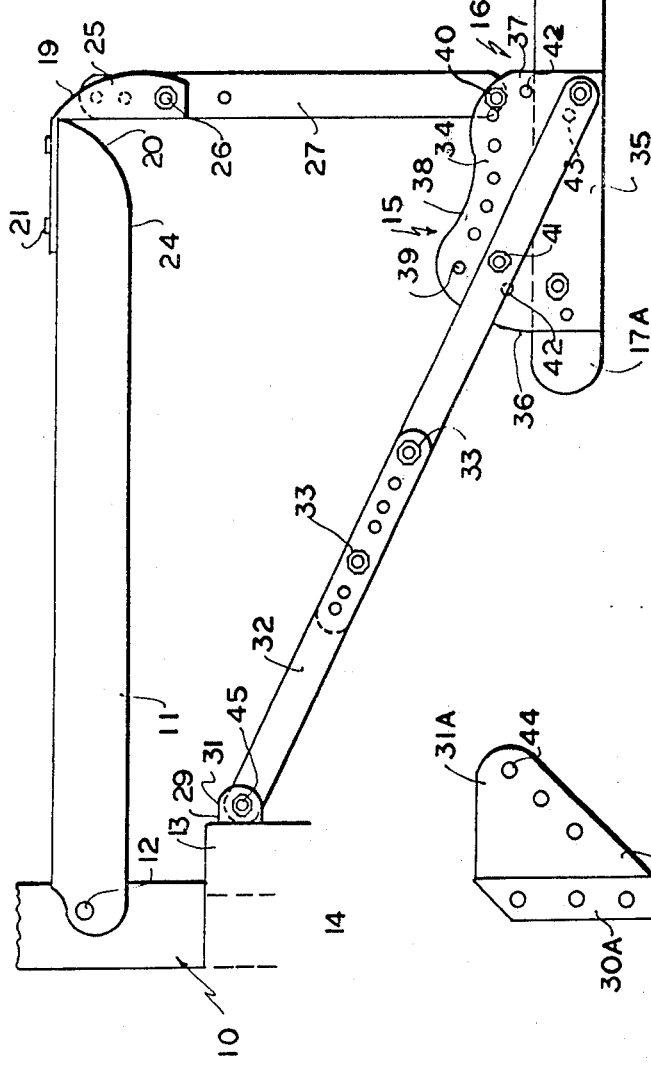
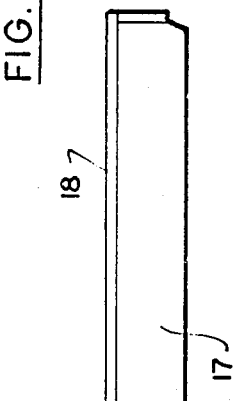

AUTOMATICALLY OPERATING TRUCK END GATE STEPS

BACKGROUND OF THE INVENTION

This invention relates to new and useful improvements in foldable step assemblies which are operatively connected between the truck body and the end gate so that when the end gate opens, the step is moved to the useful position and when the end gate is closed, the step assembly is folded upwardly to lie substantially parallel to the back of the truck.

Conventionally, these automatically operating step assemblies are designed specifically for one make or size of truck and need relatively accurate fitting in order to ensure that they operate correctly.

Furthermore, they are relatively involved and include a plurality of components which wear easily and become loose, therefore detracting from the efficient operation of the assembly.

SUMMARY OF THE INVENTION

The present invention overcomes these disadvantages by providing a relatively simple structure which includes a step component with a pair of anchor straps extending rearwardly to the truck body and a pair of hanger straps extending upwardly to the upper edge of the truck and gate. By providing fully adjustable connections between the components, the device is easily fitted to the majority of trucks with end gates and adjusted so that it operates readily and easily.

The principal object and essence of the invention is therefore to provide a step assembly which is easily attached to a truck body and to the upper edge of the end gate so that when the end gate opens, the step opens to the usable position, and when the end gate is closed, the step assembly is also automatically folded upwardly to lie substantially parallel with the rear of the truck body.

Another object of the invention is to provide a device of the character herewithin described in which all of the components include adjustments to facilitate the fitting of the device to the truck and end gate thereof.

A still further object of the invention is to provide a device of the character herewithin described which contains a minimum of moving parts thus simplifying construction and installation.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a side elevation of the device in the usable position with a truck end gate shown in the open position.

FIG. 3 is an isometric view of FIG. 1.

FIG. 4 is an isometric view of an alternative bracket which can be used if the device is attached to a frame member of the truck rather than the bumper.

In the drawings like characters of reference indicate corresponding parts in the different figures.

DETAILED DESCRIPTION

Figure 2:
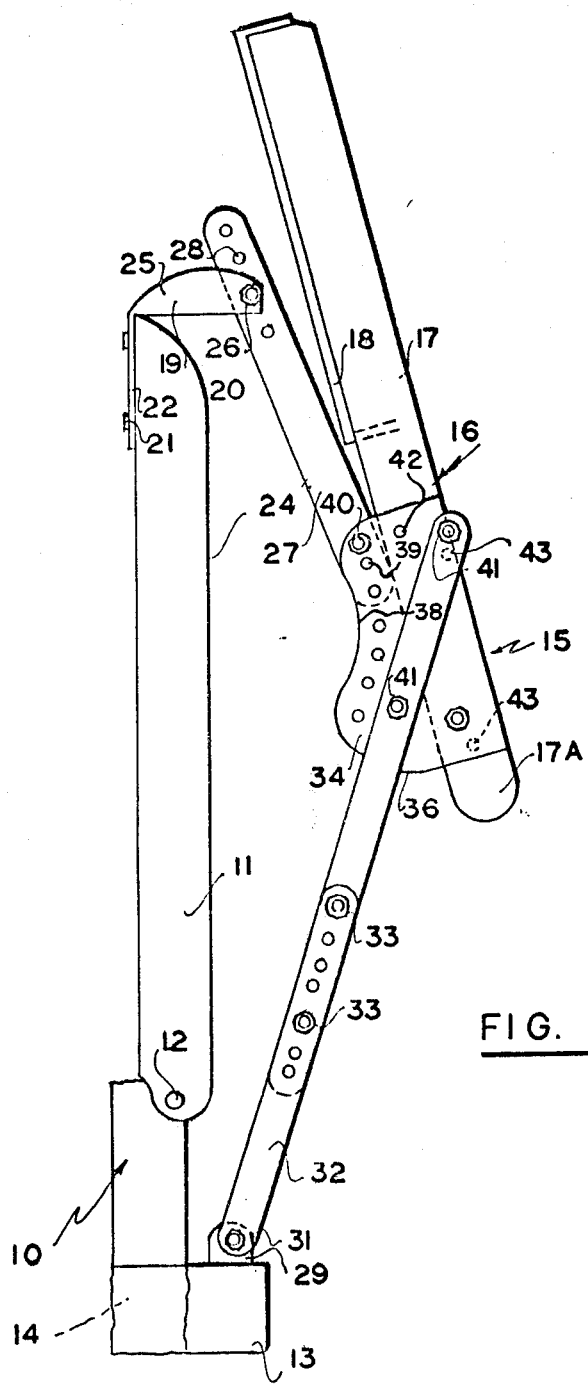
FIG. 2 is a view similar to FIG. 1, but showing the truck end gate and the step assembly in the closed and folded position respectively.

Proceeding therefore to describe the invention in detail, reference character 10 illustrates generally the rear end of a truck body having a substantially rectangular end gate 11 pivotted across the rear of the body by means of pivot pins 12 and adapted to be opened to a horizontal position shown in FIGS. 1 and 3, or to a closed position as shown in FIG. 2.

Extending transversely across the truck body and below the pivots 12, is a transverse member. In the drawings, this transverse member takes the form of bumper 13, but in some constructions, this bumper is not installed under which circumstances, the transverse frame member shown in phantom by reference character 14, is exposed, it being understood that the bumper 13 is normally secured to the transverse frame member 14.

The step assembly collectively designated 15 includes a transversely situated step member collectively designated 16. This member 16 includes a pair of spaced and parallel members 17 with a step component 18 being secured therebetween and extending transversely as clearly shown in FIG. 3. This step component is substantially rectangular when viewed in plan and can be either open mesh or can be a planar plate with a rubber tread as desired.

The members 17 extend rearwardly of the component 18 which spans the front portions of these members and the rear extensions of the members 17 are identified by reference character 17A.

First mounting means are provided and take the form of angled brackets 19 which are secured adjacent the upper edge 20 of the end gate by means of bolts or screws 21.

These brackets 19 include the end gate attaching portions 22 and portions 23 extending at right angles therefrom over the upper edge 20 of the end gate whereupon they extend beyond the outer surface 24 of the end gate. Attaching flanges 25 extend in turn from the portions 23 and are apertured to receive pivot pins or bolts 26.

A pair of hanger straps 27 consist of elongated strips of metal having a plurality of apertures 28 adjacent the upper ends thereof and the pivot pins or bolts 26 extend through any one of these apertures 28 thereby pivotally attaching the hanger straps 27 to the brackets 19.

Second mounting means are provided and are identified by means of reference character 29.

When the device or assembly is to be attached to bumper 13, the second mounting means comprise relatively small angulated brackets having a bumper attaching flange 30 and an assembly attaching flange 31 extending at right angles therefrom as clearly shown in the drawings. The brackets 29 may be secured to the bumper by means of bolts or the like and the attaching flanges 31 are apertured as clearly shown.

Anchor straps 32 comprise elongated straps of metal which are pivotally secured by one end thereof through the apertures in the flanges 31 of the second mounting means and these anchor straps 32 are made in two portions bolted together by means of nut and bolt assemblies 33 extending through pairs of apertures formed in the two portions so that the length of these anchor straps can be adjusted within limits.

Means are provided upon each side of the rear portions 17A of the step member 17 to mount the other ends of the hanger straps 27 and the other ends of the anchor straps 32.

In this embodiment, the means take the form of a pair of plates 34, one being attached to one portion 17A on one side of the step assembly and the other being attached to the other portion 17A upon the other side of the step assembly.

Each of these plates includes a lower edge or side 35 with an inner edge 36 extending upwardly from the lower edge 35 and an outer edge 37 also extending upwardly from the lower edge 35. The inner edge 36 is longer than the outer edge or side 37 so that the top edge 38 extending between these edges, inclines upwardly and rearwardly from the outer edge or end 37 towards the inner edge or end 36.

A plurality of apertures 39 is provided through the plates adjacent the top edge 38 and this row of apertures lies in an arc which is convex relative to the top edge 38 as clearly illustrated in FIG. 3 and the lower or other end of the hanger straps 27 is pivotally secured in any one of these apertures by means of a pivot nut and bolt assembly 40.

The anchor straps 32 incline downwardly and rearwardly relative to the truck when the step assembly is in the usable position shown in FIGS. 1 and 3 and is secured to the plates 34 by means of nut and bolt assemblies 41 extending through apertures within the plates. In this connection, these apertures are indicated by reference character 42 and several such apertures are provided to facilitate the assembly in the correct relationship.

It should also be noted that the plates 34 are bolted to the portions 17A and here again a plurality of apertures 43 are provided for adjustment purposes.

If the bumper 13 is not present, then the second mounting means 29 takes the form of a larger bracket 29A shown in FIG. 4. The portion 30A is bolted to the transverse frame member 14 and the flange 31A extends farther forwardly than the flange 31 so that the inner ends of the anchor straps 32 can be secured in any one of a plurality of apertures 44 in this in this flange 31A, by means of pivot nut and bolt assembly 45.

It will therefore be seen that full adjustment of all the components relative to one another are provided thus facilitating the assembly and mounting of the step assembly to the truck body and end gate so that when the truck end gate is in the down or horizontal position shown in FIG. 1, the step component 18 is extended to the usable position.

Alternatively, when the truck end gate is folded upwardly to the closed position, the step assembly is folded upwardly to lie substantially parallel to the closed truck end gate as clearly shown in FIG. 2.

Finally, it will be noted that the second mounting means 29 can be secured to the bumper 13 either on the rear face or on the upper side depending upon the installation parameters.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An automatically operating step assembly for use on trucks having an end gate transversely hinged to the rear end of the truck body, by the lower transverse edge of the end gate, said truck having transverse support means below said end gate hinge; said step assembly moving from a usable position when said end gate is open, to a folded position when said end gate is closed; said step assembly comprising in combination first mounting means securable adjacent the upper edge of the end gate, second mounting means securable to said transverse support means of said truck, a transversely situated step member, plate means on each side of said step member, a pair of hanger straps each pivotally secured by one end thereof to said first mounting means and each by the other end thereof to said plate means on each side of said step member, a pair of anchor straps each pivotally secured by one end thereof to said second mounting means and secured by the other end thereof to said plate means on each side of said step member, said step member including a pair of spaced and parallel side members and a step component spanning the front portions of said side members transversely said plate means on each side of said step member comprising a plate being secured to each side of said side members rearwardly of said step component and extending upwardly therefrom, said plate having a base and an inner end extending upwardly therefrom, and an outer end also extending upwardly from said base, and a top edge extending between said inner and outer ends, said inner end being longer than said outer end, and a plurality of apertures through said plate adjacent to said top edge lying in an arc which is concave relative to said top edge, said other ends of said hanger members being pivotally secured through any one of said apertures.

2. The assembly according to claim 1 in which said anchor straps are adjustable in length, said anchor straps being pivotally secured to said first mounting means in any one of a plurality of positions, said other ends of said hanger straps being pivotally secured to said plate means on said step member in any one of a plurality of positions on said plate means.

3. The assembly according to claim 2 in which said anchor straps incline downwardly and rearwardly from said one end thereof towards the other end thereof relative to said truck, when said step assembly is in the usable position.

4. The assembly according to claim 1 in which said anchor straps incline downwardly and rearwardly from said one end thereof towards the other end thereof relative to said truck, when said step assembly is in the usable position.

* * * * *